US012633206B2

(12) United States Patent
Ninomiya

(10) Patent No.: US 12,633,206 B2
(45) Date of Patent: May 19, 2026

(54) INFORMATION PROCESSING SYSTEM, CONTROL METHOD FOR THE SAME, AND STORAGE MEDIUM

(71) Applicant: CANON KABUSHIKI KAISHA, Tokyo (JP)

(72) Inventor: Takao Ninomiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 18/067,528

(22) Filed: Dec. 16, 2022

(65) Prior Publication Data

US 2023/0196901 A1 Jun. 22, 2023

(30) Foreign Application Priority Data

Dec. 20, 2021 (JP) ................................. 2021-205930

(51) Int. Cl.
| | |
|---|---|
| *G08B 25/01* | (2006.01) |
| *H04W 4/029* | (2018.01) |
| *H04W 4/80* | (2018.01) |

(52) U.S. Cl.
CPC .......... *G08B 25/016* (2013.01); *H04W 4/029* (2018.02); *H04W 4/80* (2018.02)

(58) Field of Classification Search
CPC ..... G08B 25/016; G08B 21/24; H04W 4/029; H04W 4/80; H04W 12/126; H04W 4/023; Y02D 30/70
See application file for complete search history.

(56) References Cited

U.S. PATENT DOCUMENTS

2022/0255650 A1* 8/2022 Daoura ................. H04W 4/029

FOREIGN PATENT DOCUMENTS

JP 2006004257 A 1/2006

* cited by examiner

*Primary Examiner* — James J Yang
(74) *Attorney, Agent, or Firm* — Canon U.S.A., Inc., IP Division

(57) ABSTRACT

An information processing system includes a first mobile terminal carried by a first user and a second mobile terminal carried by a second user accompanying the first user. The first mobile terminal includes a communication unit to communicate with a wireless tag attached to a personal belonging of the first user, an acquisition unit to acquire an inter-terminal distance between the first mobile terminal and the second mobile terminal, a detection unit to detect loss of at least the personal belonging or the first mobile terminal based on a communication status of the communication unit and the inter-terminal distance, and a transmission unit to transmit a detection result to the second mobile terminal. The second mobile terminal includes a reception unit to receive the detection result from the first mobile terminal and a control unit to control a notification indicating the detection result received by the reception unit.

11 Claims, 14 Drawing Sheets

FIG. 3

| TAG ID<br>301 | NAME OF ITEM WITH TAG<br>302 | COMMUNICATION DISTANCE FROM TERMINAL<br>303 | PRESENCE OR ABSENCE OF COMMUNICATION WITH TERMINAL<br>304 |
|---|---|---|---|
| 012044801 | UMBRELLA | 5[m] | PRESENT |
| 012044802 | WALLET | 10[m] | PRESENT |
| 012044803 | POUCH | - | ABSENT |
| : | : | : | : |
| 012044805 | PERSONAL BELONGING A | 5[m] | PRESENT |
| : | : | : | : |

FIG. 5A

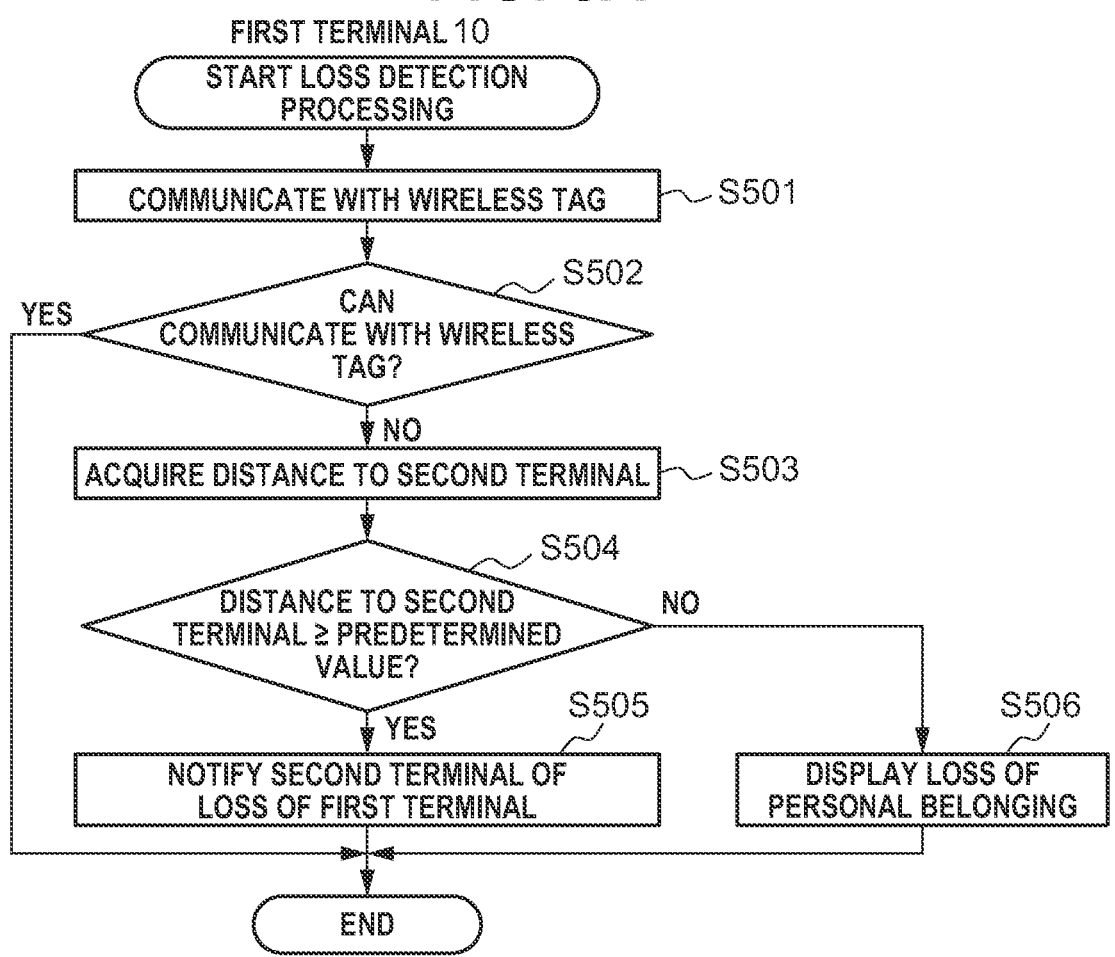

FIRST TERMINAL 10

START LOSS DETECTION PROCESSING

COMMUNICATE WITH WIRELESS TAG — S501

CAN COMMUNICATE WITH WIRELESS TAG? — S502

YES

NO

ACQUIRE DISTANCE TO SECOND TERMINAL — S503

DISTANCE TO SECOND TERMINAL ≥ PREDETERMINED VALUE? — S504

NO

YES

NOTIFY SECOND TERMINAL OF LOSS OF FIRST TERMINAL — S505

DISPLAY LOSS OF PERSONAL BELONGING — S506

END

FIG. 5B

SECOND TERMINAL 30

START LOSS DETECTION PROCESSING

NOTIFICATION OF LOSS OF FIRST TERMINAL RECEIVED FROM FIRST TERMINAL? — S511

NO

YES

DISPLAY THAT FIRST USER LOSES FIRST TERMINAL — S512

END

FIG. 6A

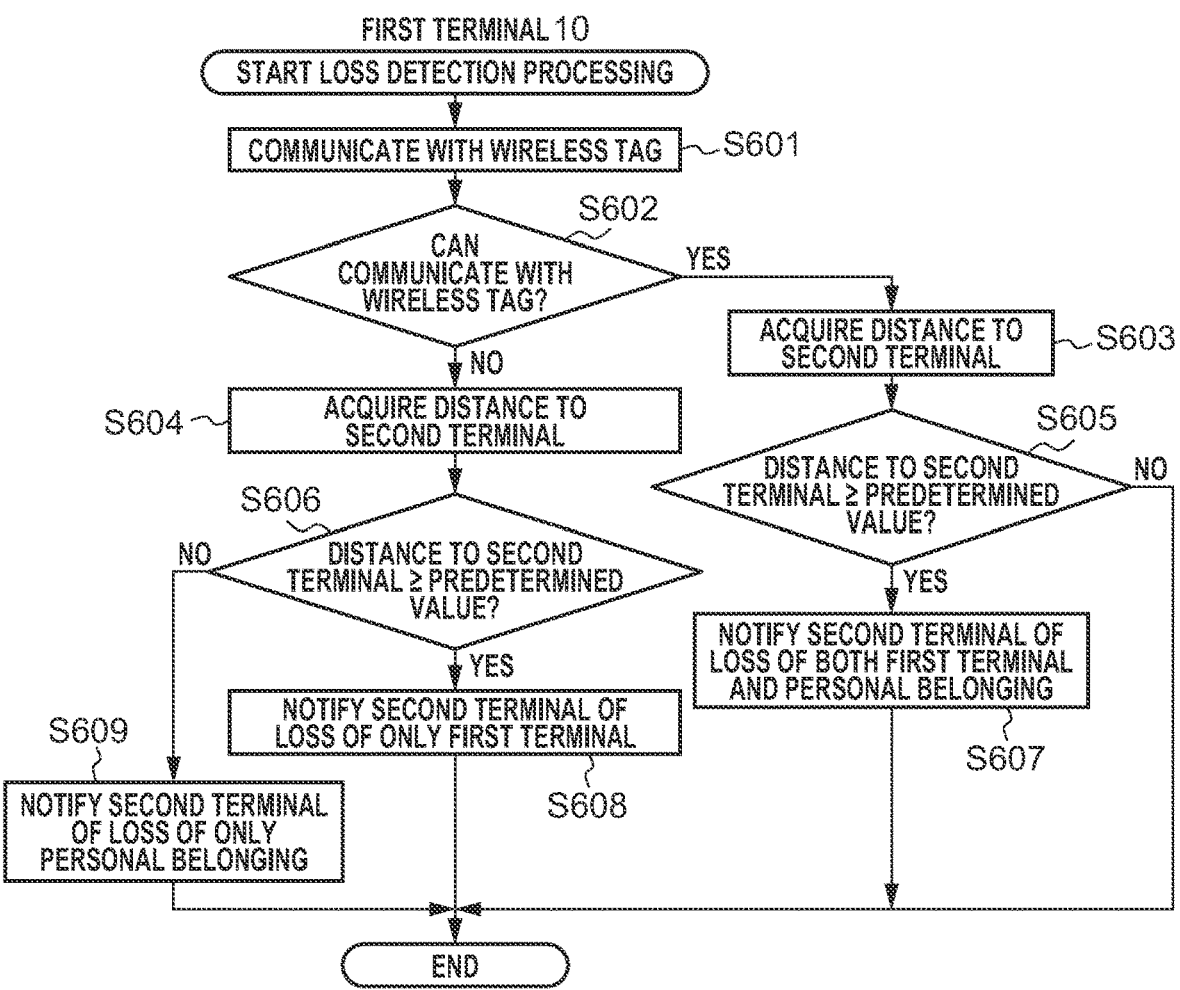

FIRST TERMINAL 10

START LOSS DETECTION PROCESSING

COMMUNICATE WITH WIRELESS TAG — S601

S602
CAN COMMUNICATE WITH WIRELESS TAG?

YES

ACQUIRE DISTANCE TO SECOND TERMINAL — S603

NO

ACQUIRE DISTANCE TO SECOND TERMINAL — S604

S605
DISTANCE TO SECOND TERMINAL ≥ PREDETERMINED VALUE?

NO

S606
DISTANCE TO SECOND TERMINAL ≥ PREDETERMINED VALUE?

NO

YES

YES

NOTIFY SECOND TERMINAL OF LOSS OF BOTH FIRST TERMINAL AND PERSONAL BELONGING

S607

NOTIFY SECOND TERMINAL OF LOSS OF ONLY FIRST TERMINAL

S608

S609
NOTIFY SECOND TERMINAL OF LOSS OF ONLY PERSONAL BELONGING

END

FIG. 6B

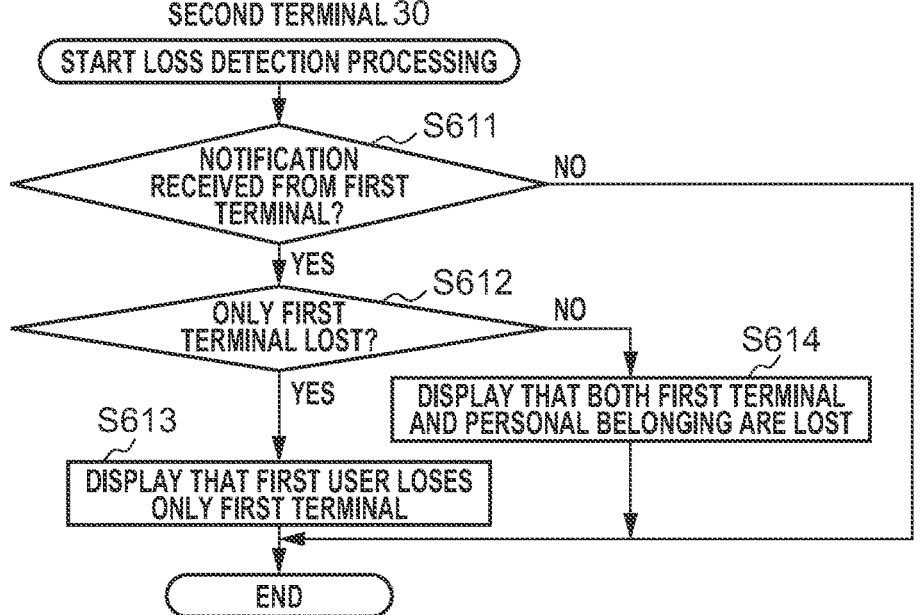

SECOND TERMINAL 30

START LOSS DETECTION PROCESSING

S611
NOTIFICATION RECEIVED FROM FIRST TERMINAL?

NO

YES

S612
ONLY FIRST TERMINAL LOST?

NO

S614
DISPLAY THAT BOTH FIRST TERMINAL AND PERSONAL BELONGING ARE LOST

YES

S613
DISPLAY THAT FIRST USER LOSES ONLY FIRST TERMINAL

END

FIG. 7A
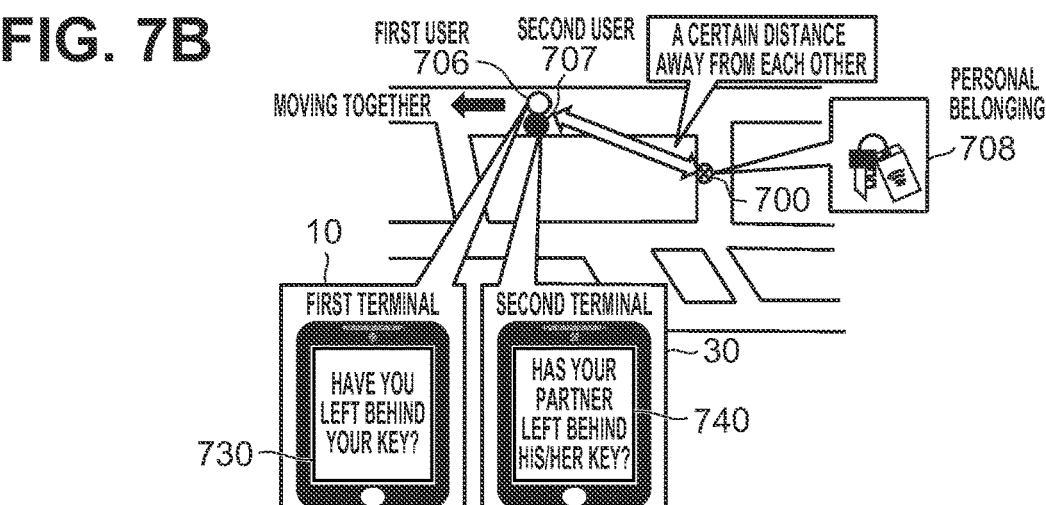
FIG. 7B
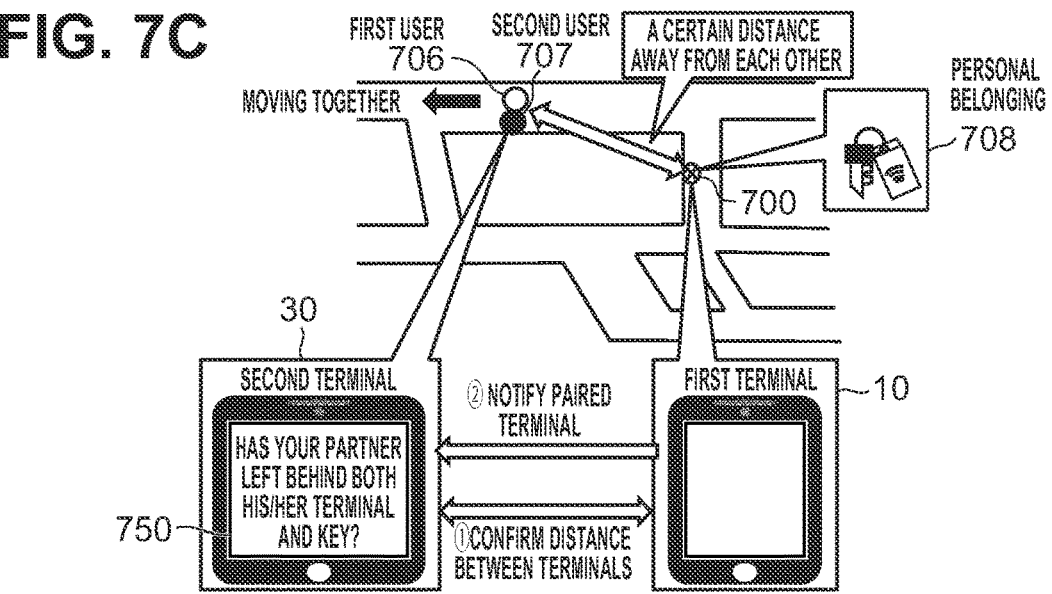
FIG. 7C

FIG. 9A

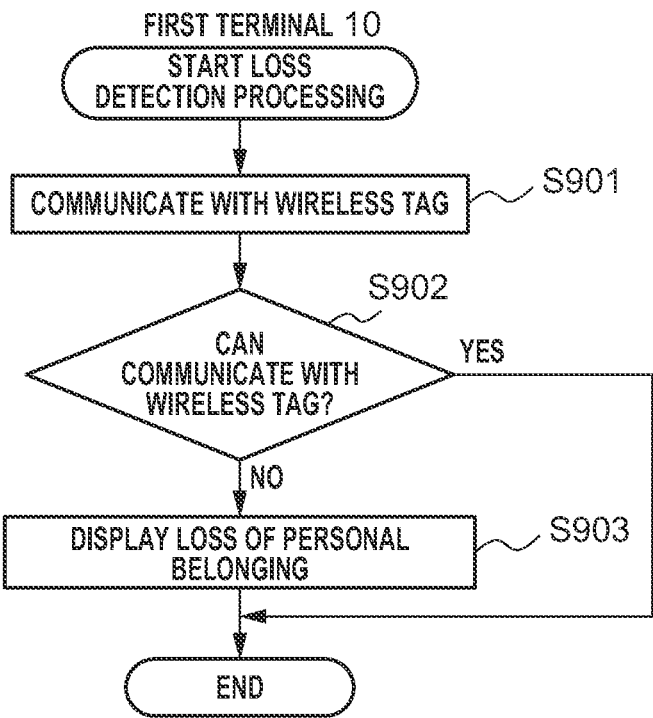

FIRST TERMINAL 10

START LOSS
DETECTION PROCESSING

COMMUNICATE WITH WIRELESS TAG — S901

CAN COMMUNICATE WITH WIRELESS TAG? — S902

YES

NO

DISPLAY LOSS OF PERSONAL BELONGING — S903

END

FIG. 9B

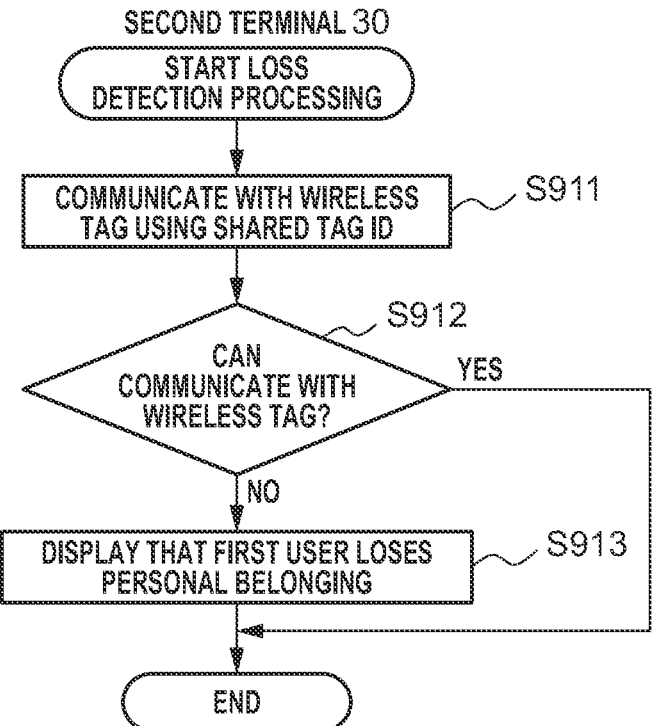

SECOND TERMINAL 30

START LOSS
DETECTION PROCESSING

COMMUNICATE WITH WIRELESS TAG USING SHARED TAG ID — S911

CAN COMMUNICATE WITH WIRELESS TAG? — S912

YES

NO

DISPLAY THAT FIRST USER LOSES PERSONAL BELONGING — S913

END

FIG. 11A

FIRST TERMINAL 10

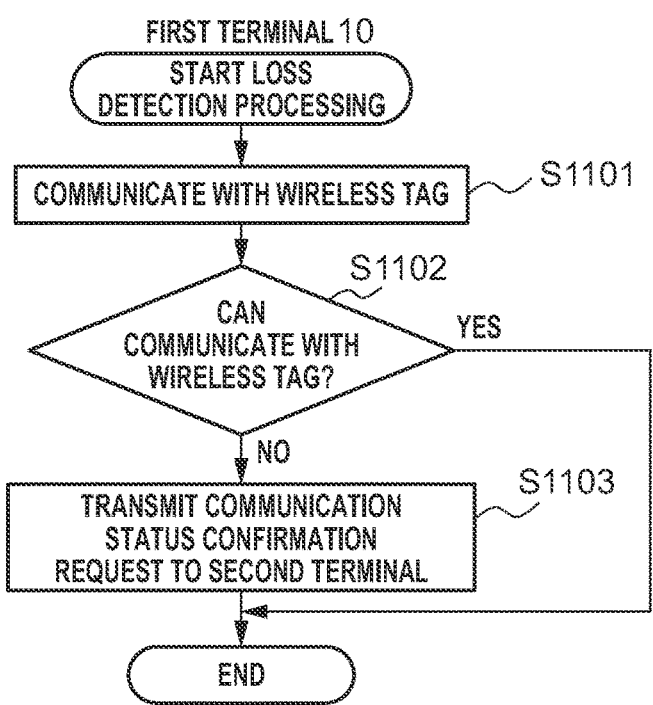

START LOSS
DETECTION PROCESSING

S1101 — COMMUNICATE WITH WIRELESS TAG

S1102 — CAN
COMMUNICATE WITH
WIRELESS TAG?

YES

NO

S1103 — TRANSMIT COMMUNICATION
STATUS CONFIRMATION
REQUEST TO SECOND TERMINAL

END

FIG. 11B

SECOND TERMINAL 30

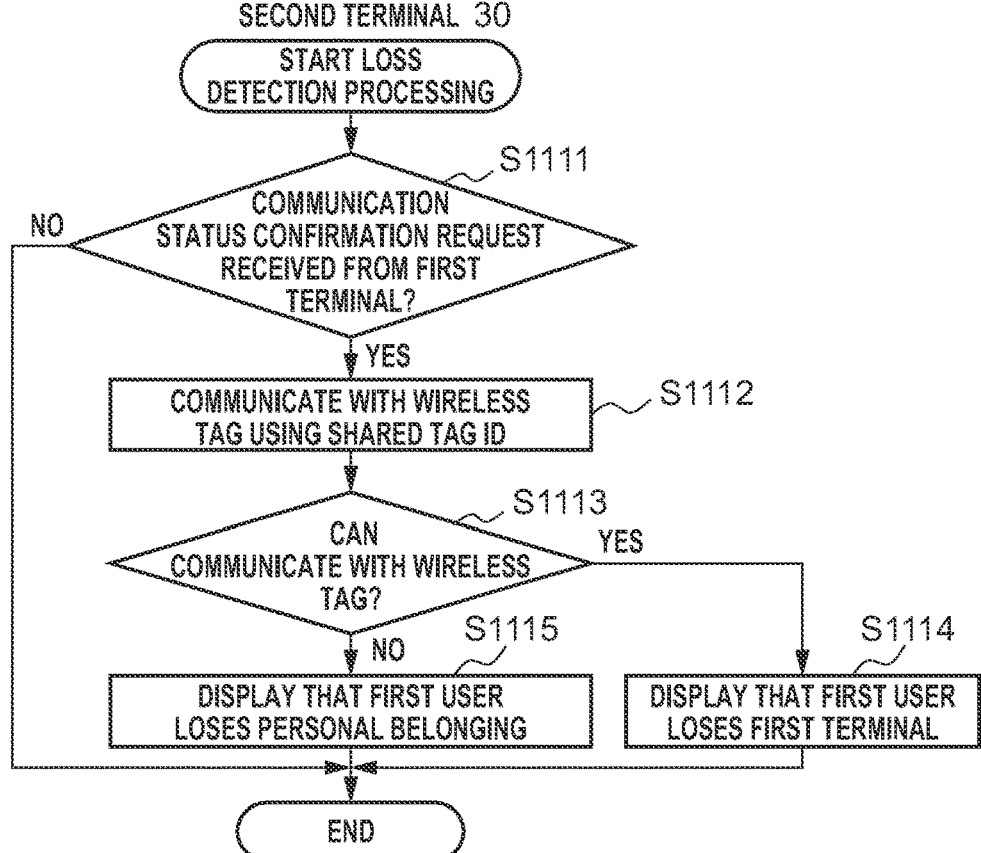

START LOSS
DETECTION PROCESSING

S1111 — COMMUNICATION
STATUS CONFIRMATION REQUEST
RECEIVED FROM FIRST
TERMINAL?

NO

YES

S1112 — COMMUNICATE WITH WIRELESS
TAG USING SHARED TAG ID

S1113 — CAN
COMMUNICATE WITH WIRELESS
TAG?

YES

NO

S1115 — DISPLAY THAT FIRST USER
LOSES PERSONAL BELONGING

S1114 — DISPLAY THAT FIRST USER
LOSES FIRST TERMINAL

END

FIG. 12

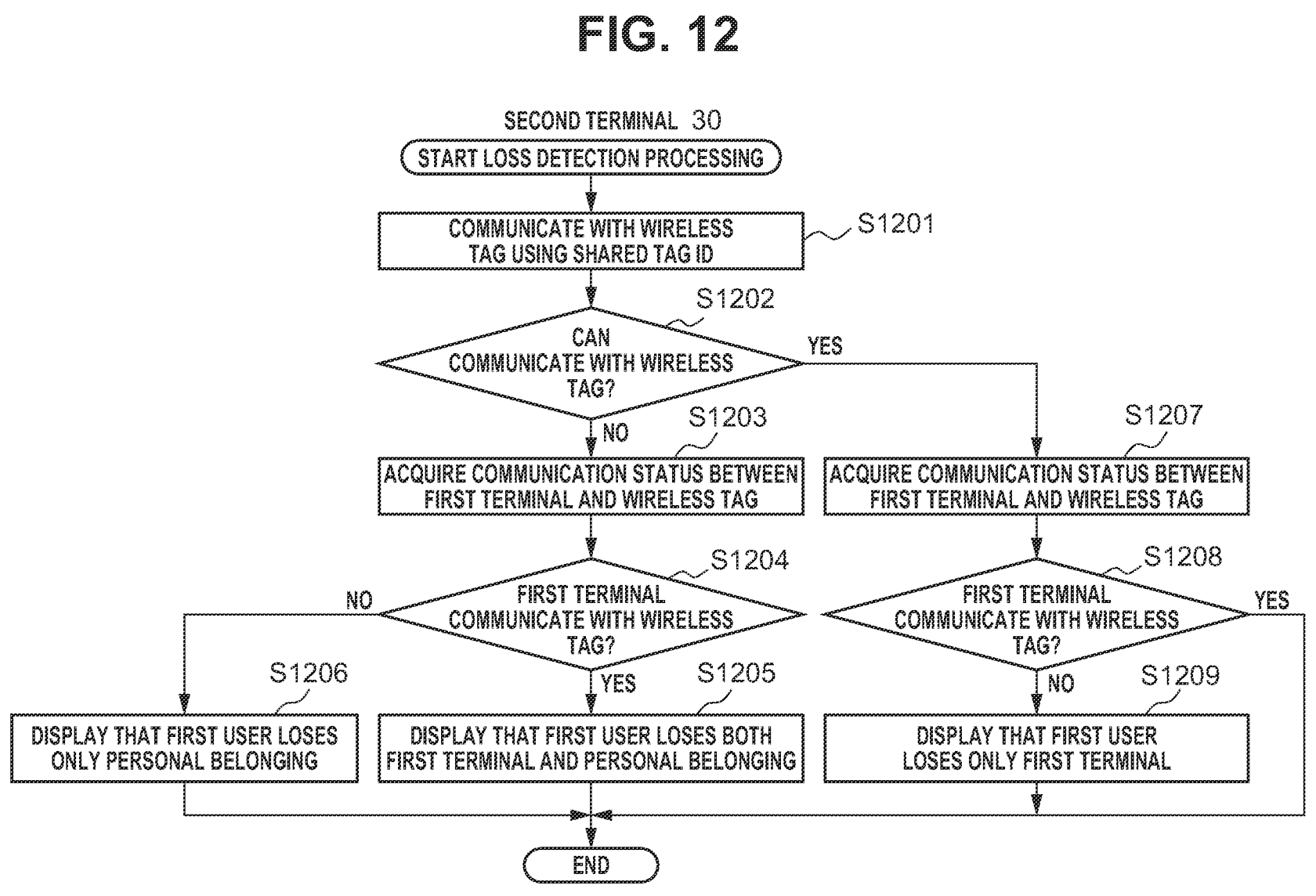

SECOND TERMINAL 30

START LOSS DETECTION PROCESSING

COMMUNICATE WITH WIRELESS TAG USING SHARED TAG ID — S1201

CAN COMMUNICATE WITH WIRELESS TAG? — S1202

YES →

NO ↓

ACQUIRE COMMUNICATION STATUS BETWEEN FIRST TERMINAL AND WIRELESS TAG — S1203

FIRST TERMINAL COMMUNICATE WITH WIRELESS TAG? — S1204

YES →

NO ↓

DISPLAY THAT FIRST USER LOSES ONLY PERSONAL BELONGING — S1206

DISPLAY THAT FIRST USER LOSES BOTH FIRST TERMINAL AND PERSONAL BELONGING — S1205

ACQUIRE COMMUNICATION STATUS BETWEEN FIRST TERMINAL AND WIRELESS TAG — S1207

FIRST TERMINAL COMMUNICATE WITH WIRELESS TAG? — S1208

YES →

NO ↓

DISPLAY THAT FIRST USER LOSES ONLY FIRST TERMINAL — S1209

END

INFORMATION PROCESSING SYSTEM, CONTROL METHOD FOR THE SAME, AND STORAGE MEDIUM

BACKGROUND

Field

The present disclosure relates to an information processing system, a control method for the information processing system, and a storage medium.

Description of the Related Art

It is not uncommon for people to leave behind or drop their personal belongings when going out. If a person has lost an item in a nearby place, the lost item can be retrieved without much trouble. However, if a person has lost an item at a faraway place on a trip or a business trip, it often takes time and effort to retrieve the lost item if he or she does not notice it early. Thus, as a technique for promptly notifying a person of loss, Japanese Patent Application Laid-Open No. 2006-4257 discusses a technique for determining that a personal belonging is lost when the distance between it and a mobile terminal exceeds a certain distance and notifying the mobile terminal of the loss.

However, according to Japanese Patent Application Laid-Open No. 2006-4257, since the loss is notified via the mobile terminal carried by a user, there is a problem that if the mobile terminal itself is lost, the user cannot be notified of the loss of the personal belonging.

SUMMARY

Aspects of the present disclosure are directed to a technique for notifying a user of loss by taking into account a case where the user has lost a mobile terminal.

According to an aspect of the present disclosure, an information processing system comprises a first mobile terminal carried by a first user and a second mobile terminal carried by a second user who accompanies the first user. The first mobile terminal includes a communication unit configured to communicate with a wireless tag attached to a personal belonging of the first user, an acquisition unit configured to acquire an inter-terminal distance between the first mobile terminal and the second mobile terminal, a detection unit configured to perform detection processing for detecting loss of at least the personal belonging or the first mobile terminal based on a communication status of the communication unit and the inter-terminal distance, and a transmission unit configured to transmit a detection result of the detection processing to the second mobile terminal. The second mobile terminal includes a reception unit configured to receive the detection result from the first mobile terminal, and a control unit configured to perform control to output a notification indicating the detection result received by the reception unit.

Further features will become apparent from the following description of exemplary embodiments with reference to the attached drawings.

BRIEF DESCRIPTION OF THE DRAWINGS

FIG. 3 illustrates an example of results of communication with wireless tags.

FIGS. 5A and 5B are flowcharts illustrating loss detection processing.

FIGS. 6A and 6B are flowcharts illustrating loss detection processing.

FIGS. 7A to 7C illustrate specific examples of a method for detecting loss.

FIGS. 9A and 9B are flowcharts illustrating loss detection processing.

FIGS. 11A and 11B are flowcharts illustrating loss detection processing.

FIG. 12 is a flowchart illustrating loss detection processing.

DESCRIPTION OF THE EMBODIMENTS

Various exemplary embodiments will be described in detail below with reference to the attached drawings.

Figure 1:
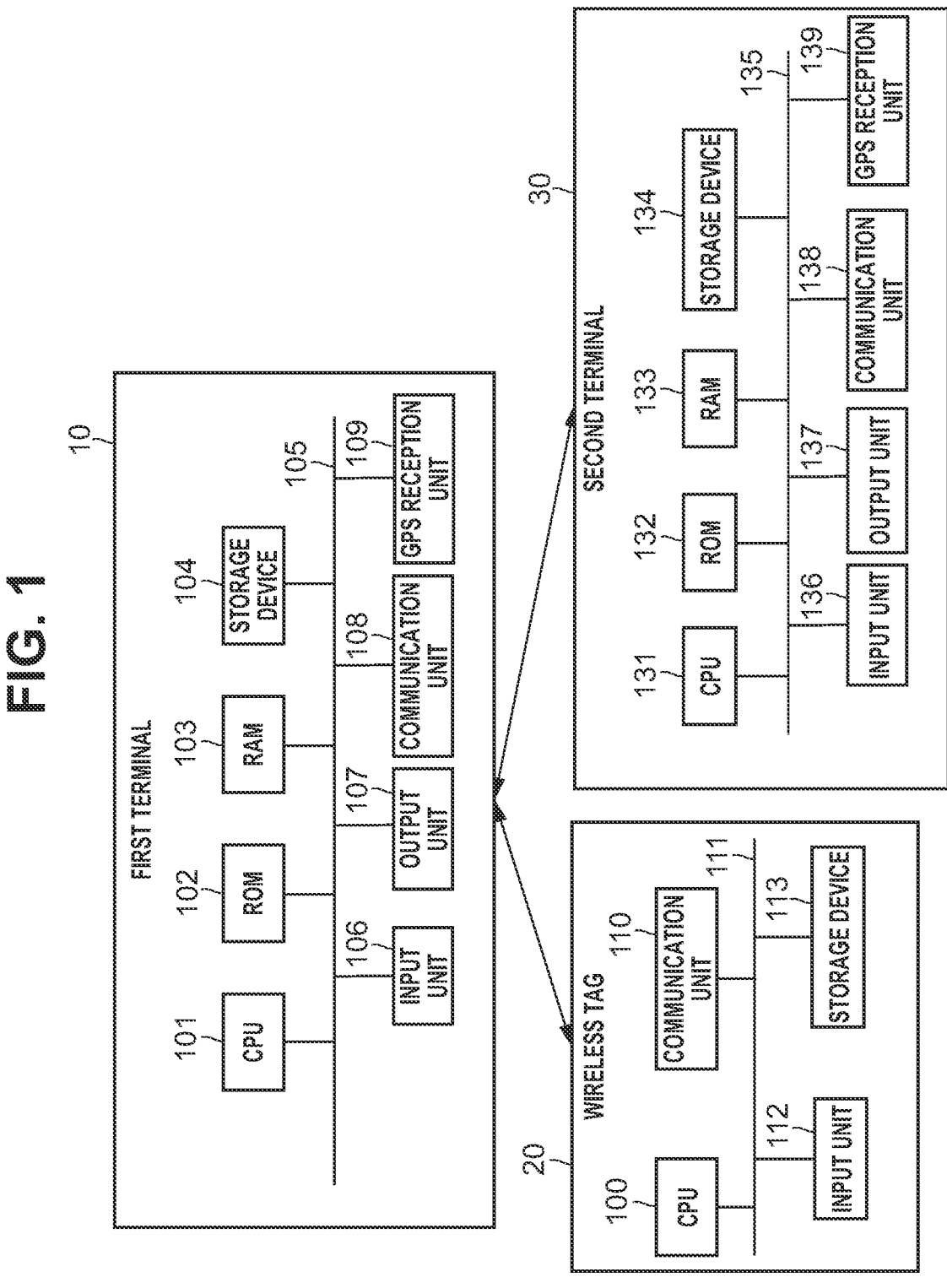
FIG. 1 illustrates an example of the overall configuration of a loss detection system.

FIG. 1 illustrates an example of the overall configuration of a loss detection system according to a first exemplary embodiment. The loss detection system illustrated in FIG. 1 includes a first terminal 10, which is a mobile terminal carried by a first user, a wireless tag 20, and a second terminal 30, which is a mobile terminal carried by a second user. The wireless tag 20 is attached to, for example, a key or a wallet of the first user. The loss detection system is an information processing system that detects the loss of the first terminal 10 or a personal belonging to which the wireless tag 20 is attached and performs processing for outputting a notification indicating a loss detection result from the first terminal 10 or the second terminal 30.

The loss detection system according to the present exemplary embodiment includes one first terminal 10, one second terminal 30, and one wireless tag 20, but can include two or more second terminals 30 and two or more wireless tags 20.

According to the present exemplary embodiment, the first terminal 10 is connectable to the wireless tag 20 via a wireless communication channel. Further, the first terminal 10 is connectable to the second terminal 30 via a wireless communication channel. The first terminal 10 shares position information about the second terminal 30 with the second terminal 30. It is assumed that the second user, who is a user of the second terminal 30, accompanies the first user, who is a user of the first terminal 10.

Next, an example of a hardware configuration of the first terminal 10 will be described. The first terminal 10 is a smartphone or a tablet terminal, and as illustrated in FIG. 1, includes a central processing unit (CPU) 101, a read-only memory (ROM) 102, a random access memory (RAM) 103, a storage device 104, an input unit 106, an output unit 107, a communication unit 108, and a Global Positioning System (GPS) reception unit 109. Each of these devices is connected to one another via a bus 105.

The CPU 101 is a microprocessor and generally controls the first terminal 10. The CPU 101 performs various controls such as connection controls with the wireless tag 20 or the second terminal 30, loss detections, the output control of a notification corresponding to a loss detection result, and the transmission control of the loss detection result to the second terminal 30. The ROM 102 is a read-only nonvolatile memory that stores a boot program and other types of program. The CPU 101 runs a boot program in start-up of the system, loads an operating system (OS) and various control programs from the storage device 104, which is a boot device, into the RAM 103, and runs them, so that the processing of the first terminal 10 in flowcharts described below is performed. The RAM 103 is a readable and writable random access memory. The RAM 103 temporarily stores various types of data used by each device. The storage device 104 is a storage including a nonvolatile memory or a removable medium such as a secure digital (SD) card, and stores an OS, various control programs, and various kinds of management data. The data stored in the storage device 104 is updated as appropriate.

The input unit 106 includes a touch panel, buttons, a camera, and a microphone, and receives inputs of various kinds of instruction and information for detecting loss. The output unit 107 outputs a notification indicating a loss detection result under the control of the CPU 101. The output unit 107 includes a display device such as a liquid crystal monitor or an audio device such as a loudspeaker, and outputs a notification to the first user on screen display or with voice if the loss is detected. According to the present exemplary embodiment, a touch panel display that has both input and display functions is used. The communication unit 108 connects to the wireless tag 20 and the second terminal 30 via the respective wireless communication channels, and transmits and receives data to and from them under the control of the CPU 101. According to the present exemplary embodiment, the communication unit 108 connects to a communication unit 110 in the wireless tag 20 via short-range wireless communication such as Bluetooth® or Bluetooth® Low Energy. The communication unit 108 also connects to a communication unit 138 in the second terminal 30 via wireless communication such as a fourth generation mobile communication system (4G) line or a fifth generation mobile communication system (5G) line. The GPS reception unit 109 continuously measures position information about its own terminal.

Next, an example of a hardware configuration of the wireless tag 20 will be described. The wireless tag 20 is a smart tag, and as illustrated in FIG. 1, includes a CPU 100, the communication unit 110, an input unit 112, and a storage device 113. Each of these devices is connected to one another via a bus 111.

The CPU 100 is a microprocessor and generally controls the wireless tag 20. The CPU 100 performs connection controls with the first terminal 10 and power ON/OFF controls. The CPU 100 reads and runs various control programs from the storage device 113. The communication unit 110 connects to the first terminal 10 via the wireless communication channel, and transmits and receives data to and from the first terminal 10 under the control of the CPU 100. According to the present exemplary embodiment, the communication unit 110 connects to the communication unit 108 in the first terminal 10 via short-range wireless communication. The input unit 112 is a button or another input component and is operated by a user to turn ON/OFF the power or to instruct the connection with the first terminal 10. The storage device 113 stores various control programs and data such as a tag identification (ID).

Next, an example of a hardware configuration of the second terminal 30 will be described. The second terminal 30 is a smartphone or a tablet terminal, and as illustrated in FIG. 1, includes a CPU 131, a ROM 132, a RAM 133, a storage device 134, an input unit 136, an output unit 137, the communication unit 138, and a GPS reception unit 139. Each of these devices is connected to one another via a bus 135. The second terminal 30 can be the same hardware configuration as the first terminal 10, so that descriptions of the similar components will be omitted.

The CPU 131 is a microprocessor and generally controls the second terminal 30. The CPU 131 performs various controls such as connection controls with the first terminal 10 and the output control of a notification corresponding to a loss detection result. The CPU 131 runs a boot program in start-up of the system, loads an OS and various control programs from the storage device 134, which is a boot device, into the RAM 133, and runs them, so that the processing of the second terminal 30 in the flowcharts described below is carried out.

The input unit 136 receives inputs of information. The output unit 137 outputs a notification to the second user on screen display or with voice based on the loss detection result under the control of the CPU 131. The communication unit 138 connects to the first terminal 10 via the wireless communication channel, and transmits and receives data to and from the first terminal 10 under the control of the CPU 131. According to the present exemplary embodiment, the communication unit 138 connects to the communication unit 108 in the first terminal 10 via wireless communication such as the 4G line or the 5G line. The GPS reception unit 139 continuously measures position information about its own terminal.

Figure 2:
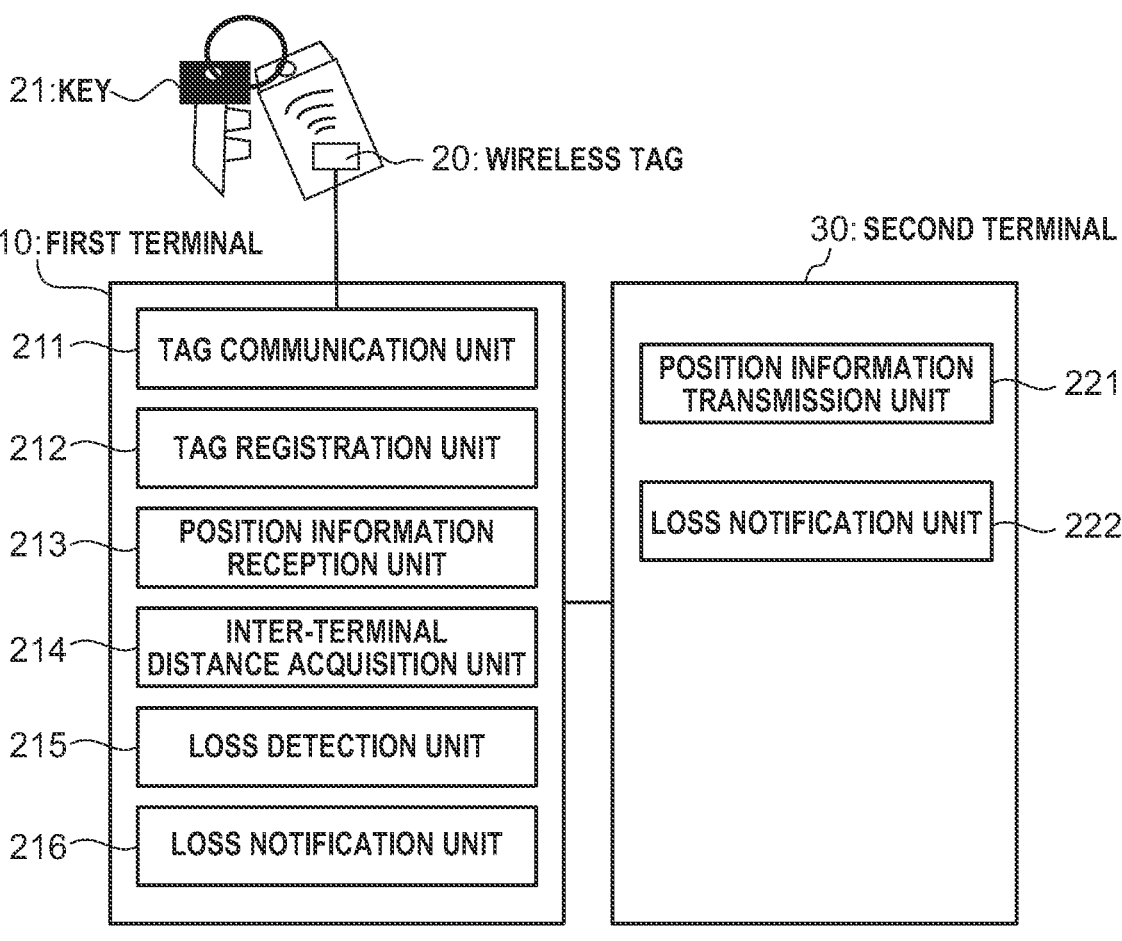
FIG. 2 illustrates an example of a functional configuration of the loss detection system.

FIG. 2 illustrates an example of a functional configuration of the loss detection system according to the present exemplary embodiment. FIG. 2 illustrates an example in which the wireless tag 20 is attached to a key 21 as a personal belonging of the first user. The first terminal 10 functions as a tag communication unit 211, a tag registration unit 212, a position information reception unit 213, an inter-terminal distance acquisition unit 214, a loss detection unit 215, and a loss notification unit 216 by the CPU 101 running a control program stored in the storage device 104. The second terminal 30 functions as a position information transmission unit 221 and a loss notification unit 222 by the CPU 131 running a control program stored in the storage device 134.

First, a functional configuration of the first terminal 10 will be described.

The tag communication unit 211 communicates with a wireless tag existing in the surroundings. The tag communication unit 211 can detect a communication distance from the wireless tag.

The tag registration unit 212 registers a tag ID of the wireless tag attached to the personal belonging. A method for pairing the tag ID with the wireless tag is used for the registration. A tag name, which is a name of the personal belonging to which the wireless tag with the tag ID is attached, is registered with the registered tag ID based on an operation to the input unit 106 by the first user. The tag ID and the tag name are stored in the storage device 104. In the following explanation, it is assumed that the tag ID of the wireless tag 20 and the key 21 are associated and registered with each other.

The position information reception unit 213 receives the position information about the second terminal 30 measured by the GPS reception unit 139 from the second terminal 30.

The inter-terminal distance acquisition unit 214 acquires the inter-terminal distance, which is a distance between the first terminal 10 and the second terminal 30. According to the present exemplary embodiment, the distance in a real space is calculated between the position information about the second terminal 30 acquired by the position information reception unit 213 and the position information measured by the GPS reception unit 109 in the first terminal 10. If the first terminal 10 can connect to the second terminal 30 via the short-range wireless communication, the inter-terminal distance can be acquired from the communication distance via the short-range wireless communication.

The loss detection unit 215 detects the loss of the first terminal 10 and the personal belonging based on a communication result with the wireless tag 20 with the registered tag ID and the inter-terminal distance acquired by the inter-terminal distance acquisition unit 214. Specifically, first, the loss detection unit 215 determines the presence or absence of communication by the tag communication unit 211 with the wireless tag 20 with the registered tag ID. If communication with the wireless tag 20 is not possible (a communication status is "absent"), there is a possibility that the first terminal 10 or the personal belonging (the key 21) is lost. According to the present exemplary embodiment, since it is assumed that the second user accompanies the first user, if the communication with the wireless tag 20 is not possible with the inter-terminal distance equal to a predetermined value or more, the loss detection unit 215 detects the loss of the first terminal 10. Further, if the communication with the wireless tag 20 is not possible with the inter-terminal distance less than the predetermined value, the loss detection unit 215 detects the loss of the personal belonging (the key 21) of the first user. The loss detection unit 215 can determine that communication is not possible, with the communication distance from the wireless tag 20 equal to the predetermined value or more.

The loss notification unit 216 performs control to output a notification indicating a detection result by the loss detection unit 215 from the first terminal 10 or the second terminal 30. The loss notification unit 216 can read the tag name of the wireless tag 20 that is not able to communicate, from the storage device 104, and include the tag name in the notification. If the loss of the personal belonging (the key 21) is detected, the loss notification unit 216 notifies the first user of the loss of the personal belonging using screen display, voice, or vibration by the output unit 107.

Further, if the loss of the first terminal 10 is detected, the loss notification unit 216 transmits the loss detection result to the second terminal 30 via the communication unit 108.

Next, a functional configuration of the second terminal 30 will be described.

The position information transmission unit 221 transmits the position information about the second terminal 30 measured by the GPS reception unit 139 to the first terminal 10.

If the loss detection result is received from the first terminal 10, the loss notification unit 222 notifies the second user of the loss using screen display, voice, or vibration by the output unit 137.

FIG. 3 illustrates an example of results of communications with the wireless tags. As illustrated in FIG. 3, a plurality of tag IDs 301 and tag names 302 of the respective tag IDs are registered with the first terminal 10. The tag ID 301 is identification information exclusive to each tag, and for example, is associated with a production number determined in production. The tag name 302 is registered with respect to the wireless tag 20 based on operation to the input unit 106 by the first user in initial communication with the wireless tag 20. If no tag name is input in registration, a name such as a personal belonging A, a personal belonging B, or a personal belonging C can be automatically assigned.

If loss detection processing is started, a "communication distance from terminal" 303 and "presence or absence of communication with terminal" 304 are acquired as communication results with respect to the tag ID 301. The communication distance from terminal 303 indicates a communication distance between the target wireless tag 20 and the first terminal 10. The presence or absence of communication with terminal 304 indicates the presence or absence of the communication between the target wireless tag 20 and the first terminal 10.

Figure 4:
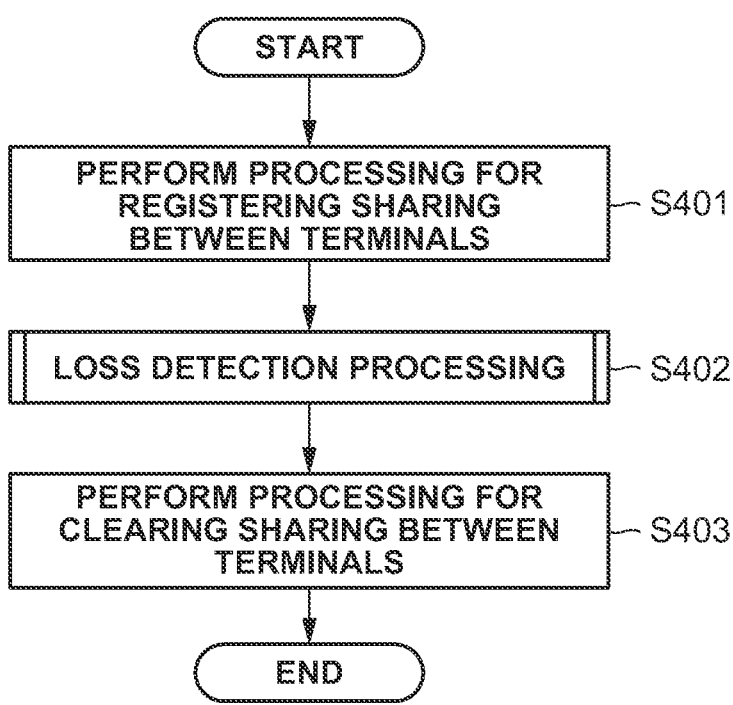
FIG. 4 is a flowchart illustrating processing performed by the loss detection system.

Next, processing performed by the loss detection system according to the present exemplary embodiment will be described. FIG. 4 is a flowchart illustrating processing performed by the loss detection system. The processing in the flowchart in FIG. 4 is started in response to when the first user operates the first terminal 10 to instruct the loss detection after the first user who carries the first terminal 10 starts accompanying the second user who carries the second terminal 30. The first user has the personal belonging to which the wireless tag 20 is attached. Each processing (step) in the flowchart will be described with S (step) at the beginning of a reference numeral. In the below flowchart, each terminal will be described as an entity of processing, and more specifically, the CPU of each terminal will be the entity of processing.

In step S401, registration processing for sharing the location information about the second terminal 30 is performed between the first terminal 10 and the second terminal 30. For example, the second user performs an input operation on the second terminal 30 and designates the first terminal 10 as a partner with which the position information about his/her terminal is shared. This enables the first terminal 10 to continuously receive the position information about the second terminal 30.

In step S402, the first terminal 10 and the second terminal 30 perform processing for detecting the loss of the first terminal 10 or the personal belonging to which the wireless tag 20 is attached. The loss detection processing in step S402 is periodically performed until processing for clearing sharing between terminals (in step S403) is performed. The loss detection processing will be described in detail with reference to flowcharts described below.

In step S403, processing is performed for clearing the sharing of the position information about the second terminal 30 between the first terminal 10 and the second terminal 30. For example, the second user performs an input operation on the second terminal 30 and excludes the first terminal 10 from the partner with which the position information about his/her terminal is shared. Then, a series of pieces of processing in the flowchart is terminated.

Next, according to the present exemplary embodiment, the loss detection processing performed in step S402 in FIG. 4 will be described with reference to FIGS. 5A and 5B, 6A and 6B, and 7A to 7C.

FIGS. 7A to 7C illustrate specific examples of a method for detecting the loss. FIGS. 7A to 7C each illustrate a situation in which a second user 707, who carries the second terminal 30, accompanies a first user 706, who carries the first terminal 10. The first terminal 10 receives the position information about the second terminal 30. The first user 706 has a personal belonging 708 to which the wireless tag 20 is attached.

An operation when the first user 706 has lost the first terminal 10 will be described with reference to FIG. 7A. If the first user 706 has lost the first terminal 10 at the place of loss 700 and then moves a certain distance away from the first terminal 10, the communication between the first terminal 10 and the wireless tag 20 attached to the personal belonging 708 of the first user 706 is lost. Upon detecting the loss of the communication, the first terminal 10 determines whether the first terminal 10 is away from the second terminal 30. As illustrated in FIG. 7A, if the first terminal 10 is away from the second terminal 30, the first terminal 10 detects the loss of the first terminal 10 and transmits a notification to the second terminal 30. The second terminal 30 that has received the notification displays a message 710 indicating that a paired user (the first user 706) has left behind the first terminal on a screen of the output unit 137. If the first terminal 10 detects that the communication with the wireless tag 20 is lost, the first terminal 10 can display a message 709 indicating that the personal belonging 708 has been left behind on a screen of the output unit 107.

FIGS. 5A and 5B are flowcharts illustrating the loss detection processing according to the present exemplary embodiment. FIG. 5A illustrates the processing on the first terminal 10, and FIG. 5B illustrates the processing on the second terminal 30.

In step S501, the first terminal 10 tries to communicate with the registered wireless tag 20.

In step S502, the first terminal 10 determines whether the first terminal 10 can communication with the registered wireless tag 20. If the first terminal 10 determines that the first terminal 10 can communicate with the registered wireless tag 20 (YES in step S502), the series of processing in the flowchart is terminated. Otherwise (NO in step S502), the processing proceeds to step S503. The first terminal 10 can acquire the tag ID from the wireless tag existing in the surroundings and make a determination by comparing the acquired tag ID with the registered tag ID.

In step S503, the first terminal 10 acquires the distance to the second terminal 30. Specifically, the first terminal 10 calculates the distance in the real space between the position information about the second terminal 30 received from the second terminal 30 and the position information measured by the GPS reception unit 109 in the first terminal 10.

In step S504, the first terminal 10 determines whether the distance to the second terminal 30 is a predetermined value or more. If it is determined that the distance to the second terminal 30 is the predetermined value or more (YES in step S504), the first terminal 10 detects the loss of the first terminal 10 and the processing proceeds to step S505. If it is determined that the distance to the second terminal 30 is less than the predetermined value (NO in step S504), the first terminal 10 detects the loss of the personal belonging to which the wireless tag 20 is attached and the processing proceeds to step S506.

In step S505, the first terminal 10 transmits a notification that the first terminal 10 is lost to the second terminal 30. Then, the series of processing in the flowchart is terminated.

In step S506, the first terminal 10 acquires the tag name associated with the wireless tag 20 that is unable to communicate and displays on the output unit 107 a message that the personal belonging with the acquired tag name is lost. Thus, the first terminal 10 notifies the first user that the personal belonging has been left behind. Then, the series of processing in the flowchart is terminated.

The flowchart in FIG. 5B will be now described

In step S511, the second terminal 30 determines whether the notification that the first terminal 10 is lost is received from the first terminal 10. If the second terminal 30 determines that the notification is received (YES in step S511), the processing proceeds to step S512. Otherwise (NO in step S511), the series of processing in the flowchart is terminated.

In step S512, the second terminal 30 displays on the output unit 137 a message that the first terminal 10 is lost. Thus, the second terminal 30 notifies the second user that the first user has left behind the first terminal 10. Then, the series of processing in the flowchart is terminated.

According to the above-described processing in the flowcharts in FIGS. 5A and 5B, even if a user has left behind his/her terminal itself, the information that the terminal has been left behind can be notified to the user by transmitting the notification to the terminal of the paired user.

Next, an operation when the personal belonging 708 is lost will be described with reference to FIG. 7B.

If the first user 706 has lost the personal belonging 708 at the place of loss 700 and then moves a certain distance away from the personal belonging 708, the communication between the first terminal 10 and the wireless tag 20 attached to the personal belonging 708 of the first user 706 is lost. Upon detecting the loss of the communication, the first terminal 10 determines whether the first terminal 10 is away from the second terminal 30. As illustrated in FIG. 7B, if the first terminal 10 is not away from the second terminal 30, the first terminal 10 detects the loss of the personal belonging 708 and display a message 730 indicating that the personal belonging 708 has been left behind on the screen of the output unit 107. The first terminal 10 also transmits a notification to the second terminal 30. The second terminal 30 that has received the notification displays a message 740 indicating that the paired user (the first user 706) has left behind the personal belonging 708 on the screen of the output unit 137. Thus, the second user 707 can inform the paired user that the personal belonging 708 has been left behind in the notification from the first terminal 10 to the second terminal 30.

According to the above-described FIGS. 7A and 7B, the operations when either the first terminal 10 or the personal belonging 708 is lost have been described. In FIG. 7C, an operation when both the first terminal 10 and the personal belonging 708 are lost will be described.

The first user 706 has left behind both the first terminal 10 and the personal belonging 708 at the place of loss 700 and then moves a certain distance away from them. In this case, the first terminal 10 can communicate with the wireless tag 20 attached to the personal belonging 708. Here, the first terminal 10 determines whether the first terminal 10 is away from the second terminal 30. As illustrated in FIG. 7C, if the first terminal 10 is away from the second terminal 30, the first terminal 10 detects the loss of both the first terminal 10 and the personal belonging 708 and transmits a notification to the second terminal 30. The second terminal 30 that has received the notification displays a message 750 indicating that the paired user (the first user 706) has left behind both the first terminal 10 and the personal belonging 708 on the screen of the output unit 137. Thus, even if the first user 706 has lost both the first terminal 10 and the personal belonging 708, the second user 707 can inform the paired user that both the first terminal 10 and the personal belonging 708 have been left behind in the notification from the first terminal 10 to the second terminal 30.

FIGS. 6A and 6B are flowcharts illustrating the loss detection processing according to the present exemplary embodiment. FIG. 6A illustrates the processing on the first terminal 10, and FIG. 6B illustrates the processing on the second terminal 30.

In step S601, the first terminal 10 tries to communicate with the registered wireless tag 20.

In step S602, the first terminal 10 determines whether the first terminal 10 can communication with the registered wireless tag 20. If the first terminal 10 determines that the first terminal 10 can communicate with the registered wireless tag 20 (YES in step S602), the processing proceeds to step S603. Otherwise (NO in step S602), the processing proceeds to step S604.

In steps S603 and S604, the first terminal 10 acquires the distance to the second terminal 30.

After the processing in step S603, the processing proceeds to step S605. After the processing in step S604, the processing proceeds to step S606.

In step S605, the first terminal 10 determines whether the distance to the second terminal 30 is the predetermined value or more. If it is determined that the distance to the second terminal 30 is the predetermined value or more (YES in step S605), the first terminal 10 detects the loss of both the first terminal 10 and the personal belonging and the processing proceeds to step S607. If it is determined that the distance to the second terminal 30 is less than the predetermined value (NO in step S605), the series of processing in the flowchart is terminated.

In step S606, the first terminal 10 determines whether the distance to the second terminal 30 is the predetermined value or more. If it is determined that the distance to the second terminal 30 is the predetermined value or more (YES in step S606), the first terminal 10 detects the loss of the first terminal 10 alone and the processing proceeds to step S608. If it is determined that the distance to the second terminal 30 is less than the predetermined value (NO in step S606), the first terminal 10 detects the loss of the personal belonging alone and the processing proceeds to step S609.

In step S607, the first terminal 10 transmits a notification that both the first terminal 10 and the personal belonging are lost to the second terminal 30. The notification includes the tag name associated with the wireless tag 20 that is unable to communicate. Then, the series of processing in the flowchart is terminated.

In step S608, the first terminal 10 transmits a notification that the first terminal 10 alone is lost to the second terminal 30. Then, the series of processing in the flowchart is terminated.

In step S609, the first terminal 10 acquires the tag name associated with the wireless tag 20 that is unable to communicate and displays on the output unit 107 a message that the personal belonging with the acquired tag name is lost. Thus, the first terminal 10 notifies the first user that the personal belonging has been left behind. Then, the series of processing in the flowchart is terminated.

The flowchart in FIG. 6B will now be described

In step S611, the second terminal 30 determines whether a notification of the loss is received from the first terminal 10. If the second terminal 30 determines that the notification is received (YES in step S611), the processing proceeds to step S612. Otherwise (NO in step S611), the series of processing in the flowchart is terminated.

In step S612, the second terminal 30 determines whether the received notification indicates that the first terminal 10 alone is lost. If the notification indicating that the first terminal 10 alone is lost (YES in step S612), the processing proceeds to step S613; otherwise (NO in step S612), the processing proceeds to step S614.

In step S613, the second terminal 30 displays on the output unit 137 a message that the first terminal 10 is lost. Thus, the second terminal 30 notifies the second user that the first user has left behind the first terminal 10. Then, the series of processing in the flowchart is terminated.

In step S614, the second terminal 30 displays on the output unit 137 a message that both the first terminal 10 and the personal belonging are lost. Thus, the second terminal 30 notifies the second user that the first user has left behind both the first terminal 10 and the personal belonging. Then, the series of processing in the flowchart is terminated.

According to the above-described processing in the flowcharts in FIGS. 6A and 6B, even if a user has left behind both his/her terminal and personal belonging, the information that both the terminal and the personal belonging have been left behind can be notified to the user by transmitting the notification to the terminal of the paired user.

Which one of the flowcharts in FIGS. 5A and 5B and FIGS. 6A and 6B is used to detect the loss can be changed as appropriate according to a user setting or another condition. For example, to detect the loss of the terminal alone, the flowcharts in FIGS. 5A and 5B are used. To detect the loss of both the terminal and the personal belonging in addition to the loss of the terminal, the flowcharts in FIGS. 6A and 6B are used.

According to the above-described first exemplary embodiment, even if a user has left behind his/her terminal itself, the information that the terminal has been left behind can be notified to the user by transmitting the notification to the terminal of the paired user.

A second exemplary embodiment will now be described. According to the first exemplary embodiment, the case has been described in which the position information about the second terminal 30 is shared between the first terminal 10 and the second terminal 30. According to a second exemplary embodiment, a case will be described in which a tag ID registered in a first terminal 10 is shared between the first terminal 10 and a second terminal 30. In the following, the descriptions of parts similar to the first exemplary embodiment will be omitted, and differences mainly described.

Figure 8:
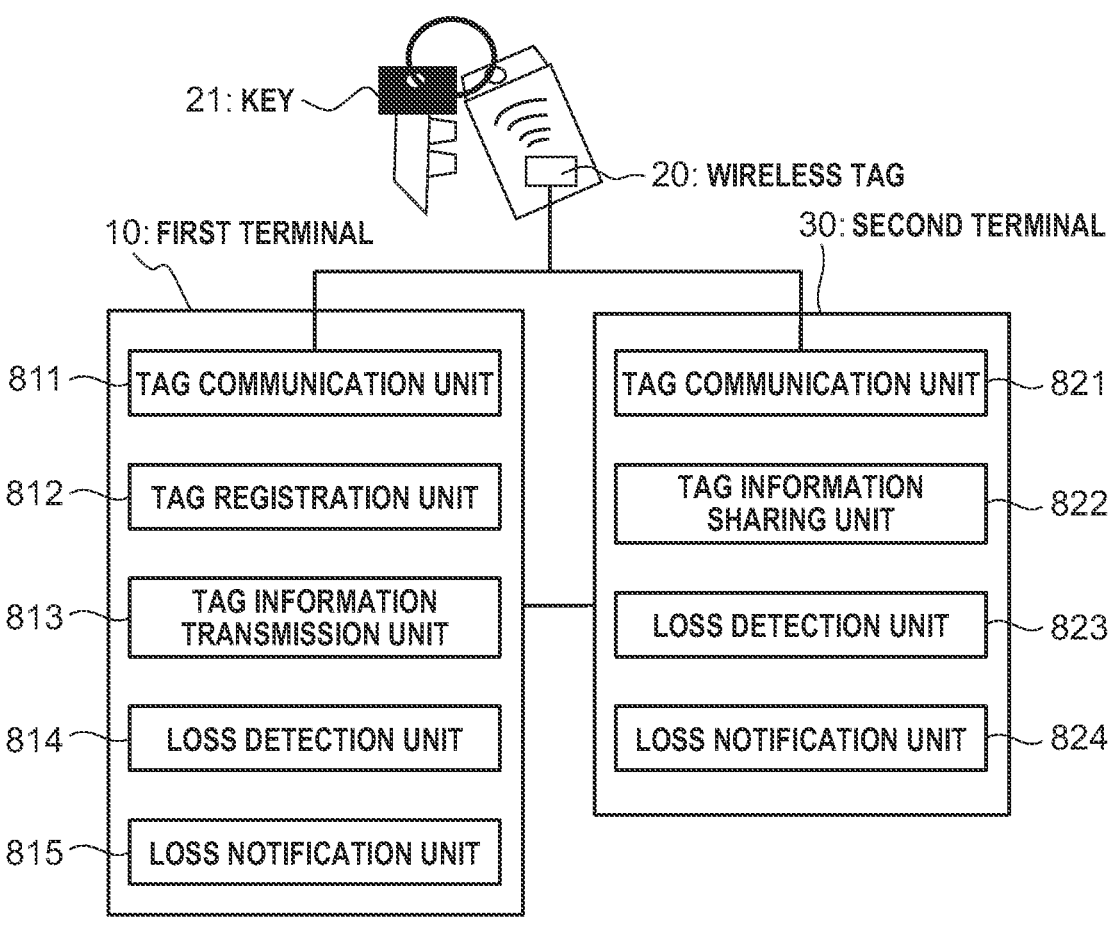
FIG. 8 illustrates an example of a functional configuration of the loss detection system.

FIG. 8 illustrates an example of a functional configuration of a loss detection system according to the second exemplary embodiment. According to the present exemplary embodiment, the second terminal 30 can also connect to the wireless tag 20 via a wireless communication channel. The first terminal 10 functions as a tag communication unit 811, a tag registration unit 812, a tag information transmission unit 813, a loss detection unit 814, and a loss notification unit 815 by the CPU 101 running a control program stored in the storage device 104. The second terminal 30 functions as a tag communication unit 821, a tag information sharing unit 822, a loss detection unit 823, and a loss notification unit 824 by the CPU 131 running a control program stored in the storage device 134.

First, a functional configuration of the first terminal 10 will be described.

The tag communication unit 811 and the tag registration unit 812 are similar to the tag communication unit 211 and the tag registration unit 212 in FIG. 2, respectively.

The tag information transmission unit 813 transmits the registered tag ID and the tag name to the second terminal 30.

The loss detection unit 814 detects the loss of a personal belonging based on a communication result with the wireless tag 20 with the registered tag ID. Specifically, the loss detection unit 814 determines the presence or absence of communication performed by the tag communication unit 811 with the wireless tag 20 with the registered tag ID. If there is no communication, the loss detection unit 814 detects the loss of the personal belonging (the key 21) of the first user.

The loss notification unit 815 performs control to output a notification indicating a detection result made by the loss detection unit 814 from the output unit 107. If the loss is detected, the loss notification unit 815 notifies the first user of the loss using screen display, voice, or vibration by the output unit 107.

Next, a functional configuration of the second terminal 30 will be described.

The tag communication unit 821 is similar to the tag communication unit 811.

The tag information sharing unit 822 receives the tag ID and the tag name from the first terminal 10 and registers the received tag ID and the tag name by associating them with the first terminal 10. The registered information is stored in the storage device 134.

The loss detection unit 823 detects the loss of the personal belonging based on a communication result with the wireless tag 20 with the tag ID registered by the tag information sharing unit 822. Specifically, the loss detection unit 823 determines the presence or absence of communication performed by the tag communication unit 821 with the wireless tag 20 with the registered tag ID. If there is no communication, the loss detection unit 823 detects the loss of the personal belonging (the key 21) of the first user.

The loss notification unit 824 performs control to output a notification indicating a detection result made by the loss detection unit 823 from the output unit 17. If the loss is detected, the loss notification unit 824 notifies the second user of the loss using screen display, voice, or vibration by the output unit 137.

In step S401 in FIG. 4 according to the present exemplary embodiment, registration processing is performed to share the tag ID and the tag name registered in the first terminal 10 between the first terminal 10 and the second terminal 30. For example, the first user performs an input operation on the first terminal 10 and designates the second terminal 30 as a partner with which the tag ID and the tag name that are paired in its own terminal are shared. Thus, the tag ID and the tag name registered in the first terminal 10 are also registerable in the second terminal 30. If the registration processing is performed, the first user can select the tag ID and the tag name to be shared between the first terminal 10 and the second terminal 30.

In step S403 in FIG. 4 according to the present exemplary embodiment, processing is performed for clearing the sharing of the tag ID and the tag name of the second terminal 30 between the first terminal 10 and the second terminal 30. For example, the first user performs an input operation on the first terminal 10 and excludes the second terminal 30 from the partner with which the tag ID and the tag name that are paired in its own terminal are shared.

Next, according to the present exemplary embodiment, the loss detection processing performed in step S402 in FIG. 4 will be described with reference to FIGS. 9A, 9B, and 10.

Figure 10:
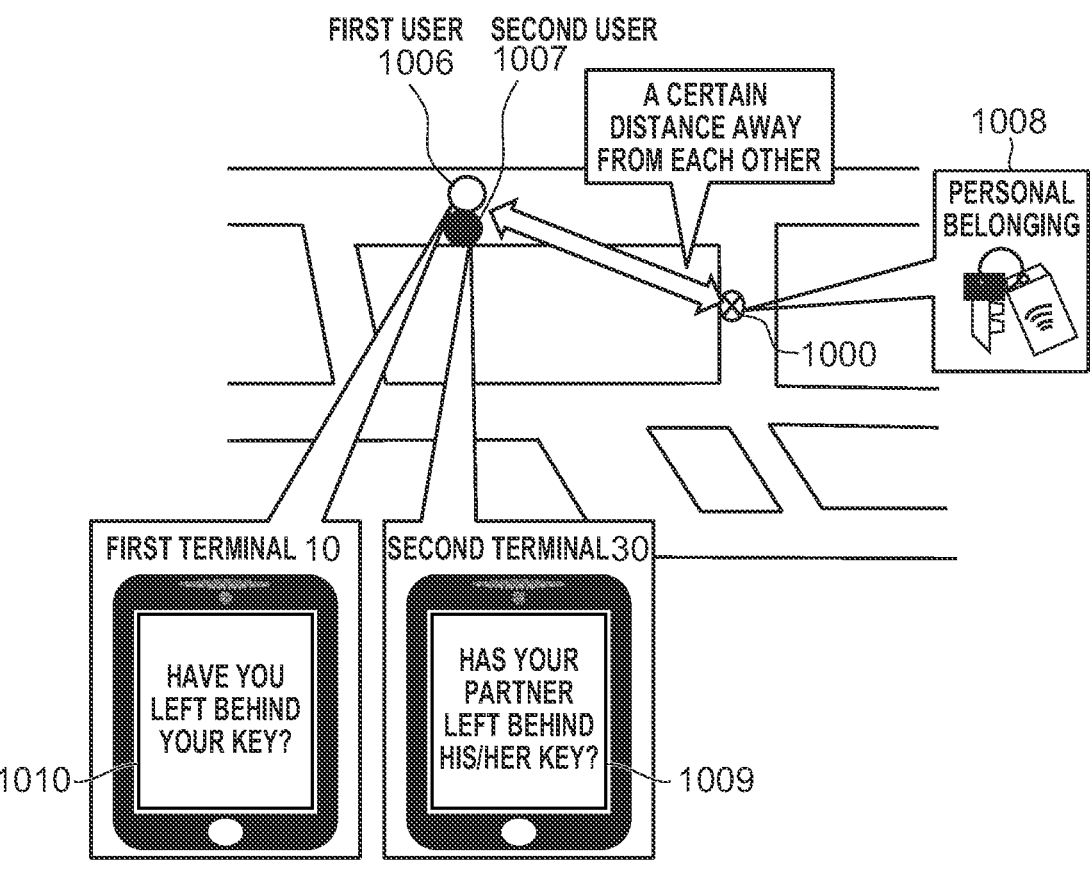
FIG. 10 illustrates a specific example of a method for detecting loss.

FIG. 10 illustrates a specific example of a method for detecting the loss. FIG. 10 illustrates a situation in which a second user 1007, who carries the second terminal 30, accompanies a first user 1006, who carries the first terminal 10. The second terminal 30 stores the tag ID registered in the first terminal 10. The first user 1006 has a personal belonging 1008 to which the wireless tag 20 is attached.

An operation when the first user 1006 has lost the personal belonging 1008 will be described with reference to FIG. 10. If the first user 1006 has lost the personal belonging 1008 at the place of loss 1000 and then moves a certain distance away from the personal belonging 1008, the communication between the first terminal 10 and the wireless tag 20 attached to the personal belonging 1008 of the first user 1006 is lost. Upon detecting the loss of the communication, the first terminal 10 detects loss of the personal belonging 1008 and displays a message 1010 indicating that the personal belonging 1008 is left behind on a screen of the output unit 107. According to the present exemplary embodiment, as it is assumed the second user 1007 accompanies the first user 1006, the second terminal 30 also detects the loss of the personal belonging 1008. If the second terminal 30 detects the loss of the personal belonging 1008, the second terminal 30 displays on the output unit 137 a message 1009 indicating that the first user 1006 as a sharing partner has left behind the personal belonging 1008. Thus, even if the first terminal 10 cannot be used due to a dead battery or another cause, the configuration can notice a paired user that the personal belonging 1008 has been left behind.

FIGS. 9A and 9B are flowcharts illustrating the loss detection processing according to the present exemplary embodiment. FIG. 9A illustrates the processing on the first terminal 10, and FIG. 9B illustrates the processing on the second terminal 30.

In step S901, the first terminal 10 tries to communicate with the registered wireless tag 20.

In step S902, the first terminal 10 determines whether the first terminal 10 can communication with the registered wireless tag 20. If the first terminal 10 determines that the first terminal 10 can communicate with the registered wireless tag 20 (YES in step S902), the series of processing in the flowchart is terminated. Otherwise (NO in step S902), the processing proceeds to step S903.

In step S903, the first terminal 10 acquires the tag name associated with the wireless tag 20 that is unable to communicate and displays on the output unit 107 a message that the personal belonging with the acquired tag name is lost. Thus, the first terminal 10 notifies the first user that the personal belonging has been left behind. Then, the series of processing in the flowchart is terminated.

The flowchart in FIG. 9B will now be described

In step S911, the second terminal 30 tries to communicate with the shared wireless tag 20.

The shared wireless tag 20 is the wireless tag 20 with the tag ID that is shared and registered in association with the first terminal 10.

In step S912, the second terminal 30 determines whether the second terminal 30 can communication with the shared wireless tag 20. If the second terminal 30 determines that the second terminal 30 can communicate with the shared wireless tag 20 (YES in step S912), the series of processing in the flowchart is terminated. Otherwise (NO in step S912), the processing proceeds to step S913.

In step S913, the second terminal 30 acquires the tag name associated with the wireless tag 20 that is unable to communicate and displays on the output unit 137 a message that the personal belonging with the acquired tag name is lost. Thus, the second terminal 30 notifies the second user that the first user has left behind the personal belonging. Then, the series of processing in the flowchart is terminated.

According to the above-described second exemplary embodiment, the first terminal 10 shares information about the paired wireless tag with the second terminal 30, allowing the second terminal 30 to also detect the loss. Thus, even if the first terminal 10 cannot be used due to a dead battery or another cause, the configuration can notice a paired user that the personal belonging has been left behind.

Next, a case in which a communication status between the first terminal 10 and the wireless tag 20 are taken into account, in addition to a communication status between the second terminal 30 and the wireless tag 20 will be described as a modification of the second exemplary embodiment. In this case, the loss of the first terminal 10 can be detected even without acquiring the inter-terminal distance between the first terminal 10 and the second terminal 30 as in the first exemplary embodiment.

A first modification will now be described. First, if the first user has lost the first terminal 10 and is a certain distance away from the first terminal 10, the communication between the first terminal 10 and the wireless tag 20 attached to the personal belonging is lost.

Upon detecting the loss of the communication, the first terminal 10 transmits a request to the second terminal 30 to confirm a communication status with the wireless tag 20. If the second terminal 30 normally communicates with the wireless tag 20, that means that the first terminal 10 alone is away from the second terminal 30 and the wireless tag 20, so that the loss of the first terminal 10 is detected.

FIGS. 11A and 11B are flowcharts illustrating the loss detection processing according to the present modification. FIG. 11A illustrates the processing on the first terminal 10, and FIG. 11B illustrates the processing on the second terminal 30.

In FIG. 11A, the processing in step S1103 is performed in place of the processing in step S903 in FIG. 9A.

In step S1103, the first terminal 10 transmits to the second terminal 30 a communication status confirmation request including the tag ID of the wireless tag 20 that is unable to communicate.

The flowchart in FIG. 11B will now be described.

In step S1111, the second terminal 30 determines whether the communication status confirmation request is received from the first terminal 10. If the second terminal 30 determines that the communication status confirmation request is received (YES in step S1111), the processing proceeds to step S1112. Otherwise (NO in step S1111), a series of processing in the flowchart is terminated.

In step S1113, the second terminal 30 determines whether the second terminal 30 can communicate with the wireless tag 20 with the tag ID included in the communication status confirmation request. If it is determined that the second terminal 30 can communicate with the wireless tag 20 (YES in step S1113), the second terminal 30 detects the loss of the first terminal 10 and the processing proceeds to step S1114. Otherwise (NO in step S1113), the second terminal 30 detects the loss of the personal belonging and the processing proceeds to step S1115.

In step S1114, the second terminal 30 displays on the output unit 137 a message that the first terminal 10 is lost. Thus, the second terminal 30 notifies the second user that the first user has left behind the first terminal 10. Then, the series of processing in the flowchart is terminated.

In step S1115, the second terminal 30 displays on the output unit 137 a message that the personal belonging is lost. Thus, the second terminal 30 notifies the second user that the first user has left behind the personal belonging. Then, the series of processing in the flowchart is terminated.

According to the above-described first modification of the second exemplary embodiment, even if a user has left behind his/her terminal itself, the information that the terminal has been left behind can be notified to the user by transmitting the notification to the terminal of the paired user.

Next, a second modification will be described. According to the present modification, a case will be described in which the presence or absence of communication and the communication distance between the first terminal 10 and the wireless tag 20 are shared between the first terminal 10 and the second terminal 30, in addition to the tag ID and the tag name. Specifically, when the registration processing in step S401 in FIG. 4 is performed, the communication result with respect to the wireless tag 20 with the tag ID, in addition to the tag ID and the tag name registered in the first terminal 10, is shared. Thus, the second terminal 30 can continuously receive the presence or absence of communication and the communication distance between the first terminal 10 and the wireless tag 20.

FIG. 12 is a flowchart illustrating the loss detection processing according to the present modification. FIG. 12 illustrates the processing on the second terminal 30. The processing on the first terminal 10 is similar to that in FIG. 9A.

The processing in steps S1201 and S1202 in FIG. 12 is similar to that in steps S911 and S912 in FIG. 9B. In step S1202, if the second terminal 30 determines that the second terminal 30 can communicate with the shared wireless tag 20 (YES in step S1202), the processing proceeds to step S1207. Otherwise (NO in step S1202), the processing proceeds to step S1203.

In steps S1203 and S1207, the second terminal 30 acquires a communication status of the first terminal 10 with respect to the wireless tag 20 that is unable to communicate. After the processing in step S1203, the processing proceeds to step S1204. After the processing in step S1207, the processing proceeds to step S1208.

In step S1204, the second terminal 30 determines whether the communication status of the first terminal 10 acquired in step S1203 is good or bad. If it is determined that the communication status is bad (NO in step S1204), the second terminal 30 detects the loss of the personal belonging alone and the processing proceeds to step S1206, which is the same as step S1115. If it is determined that the communication status is good (YES in step S1204), the second terminal 30 detects the loss of both the first terminal 10 and the personal belonging and the processing proceeds to step S1205.

In step S1205, the second terminal 30 displays on the output unit 137 a message that both the first terminal 10 and the personal belonging are lost. Thus, the second terminal 30 notifies the second user that the first user has lost both the first terminal 10 and the personal belonging. Then, a series of processing in the flowchart is terminated.

In step S1208, the second terminal 30 determines whether the communication status of the first terminal 10 acquired in step S1207 is good or bad. If it is determined that the communication status of the first terminal 10 is bad (NO in step S1208), the second terminal 30 detects the loss of the first terminal 10 alone and the processing proceeds to step S1209, which is the same as step S1114. If it is determined that the communication status is good (YES in step S1208), the series of processing in the flowchart is terminated.

According to the above-described second modification of the second exemplary embodiment, even if a user has left behind both his/her terminal and a personal belonging, the information that both the terminal and the personal belonging have been left behind can be notified to the user by transmitting the notification to the terminal of the paired user.

A third exemplary embodiment will now be described. According to each of the above-described exemplary embodiments, it is assumed that the processing for sharing the position information and the tag ID between the first terminal 10 and the second terminal 30 is performed via manual operations by the user. Similarly, it is also assumed that the processing for clearing the sharing is performed through manual operations by the user. According to the third exemplary embodiment, a case will be described in which processing for registering sharing between terminals, which is performed in step S401 in FIG. 4, and processing for clearing sharing between terminals, which is performed in step S403 in FIG. 4, are automatically performed.

Figure 13:
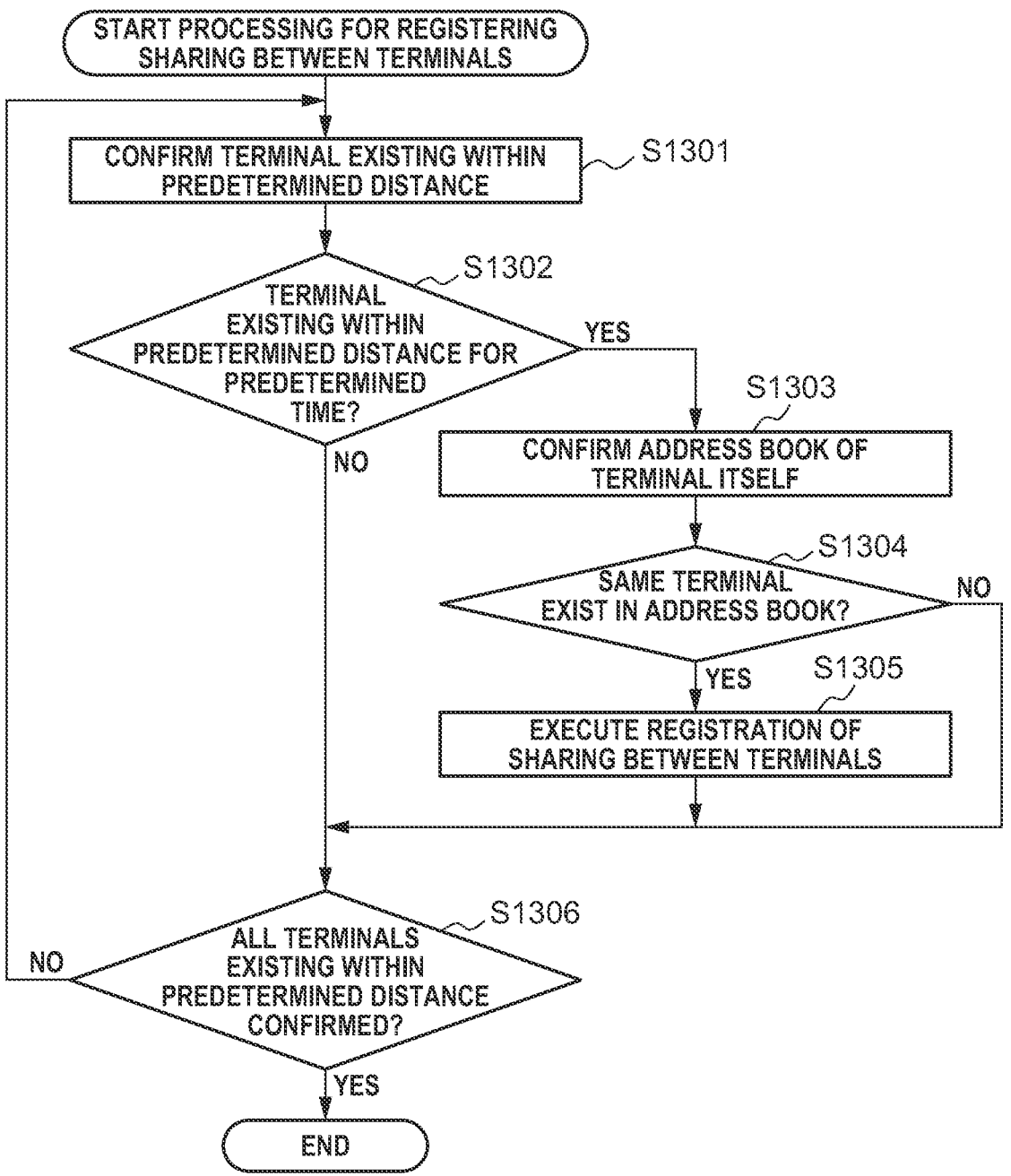
FIG. 13 is a flowchart illustrating processing for registering sharing between terminals.

FIG. 13 is a flowchart illustrating processing for registering sharing between terminals according to the third exemplary embodiment. The processing in the present flowchart is periodically performed. In the present exemplary embodiment, the following is a description on the assumption that the processing is performed by the first terminal 10, but the processing can be performed by the second terminal 30.

In step S1301, the first terminal 10 performs processing for confirming a terminal that exists within a predetermined distance.

In step S1302, the first terminal 10 determines whether the terminal exists within the predetermined distance for a predetermined time or longer. Specifically, the first terminal 10 acquires the communication distance from the terminal existing in the surroundings via the short-range wireless communication and determines whether the acquired communication distance is within the predetermined distance for a predetermined time or longer. If the first terminal 10 determines that the terminal exists within the predetermined distance for the predetermined time or longer (YES in step S1302), the processing proceeds to step S1303. If it is determined that no terminal satisfying the above-described conditions exists (NO in step S1302), the processing proceeds to step S1306.

In step S1303, the first terminal 10 transmits a request for address information to the terminal that exists within the predetermined distance for the predetermined time or longer and compares a response with information in an address book of the first terminal 10 itself.

In step S1304, the first terminal 10 determines whether the target terminal exists in the address book based on the comparison result in step S1303. If the first terminal 10 determines that the target terminal exists in the address book (YES in step S1304), the processing proceeds to step S1305. Otherwise (NO in step S1304), the processing proceeds to step S1306.

In step S1305, the first terminal 10 shares the position information and the paired tag ID with the target terminal.

In step S1306, the first terminal 10 repeatedly performs the processing in steps S1303 to S1305 on all the terminals that exist within the predetermined distance for the predetermined time or longer. If the processing is performed on all the terminals (YES in step S1306), then the series of processing in the flowchart is terminated.

Figure 14:
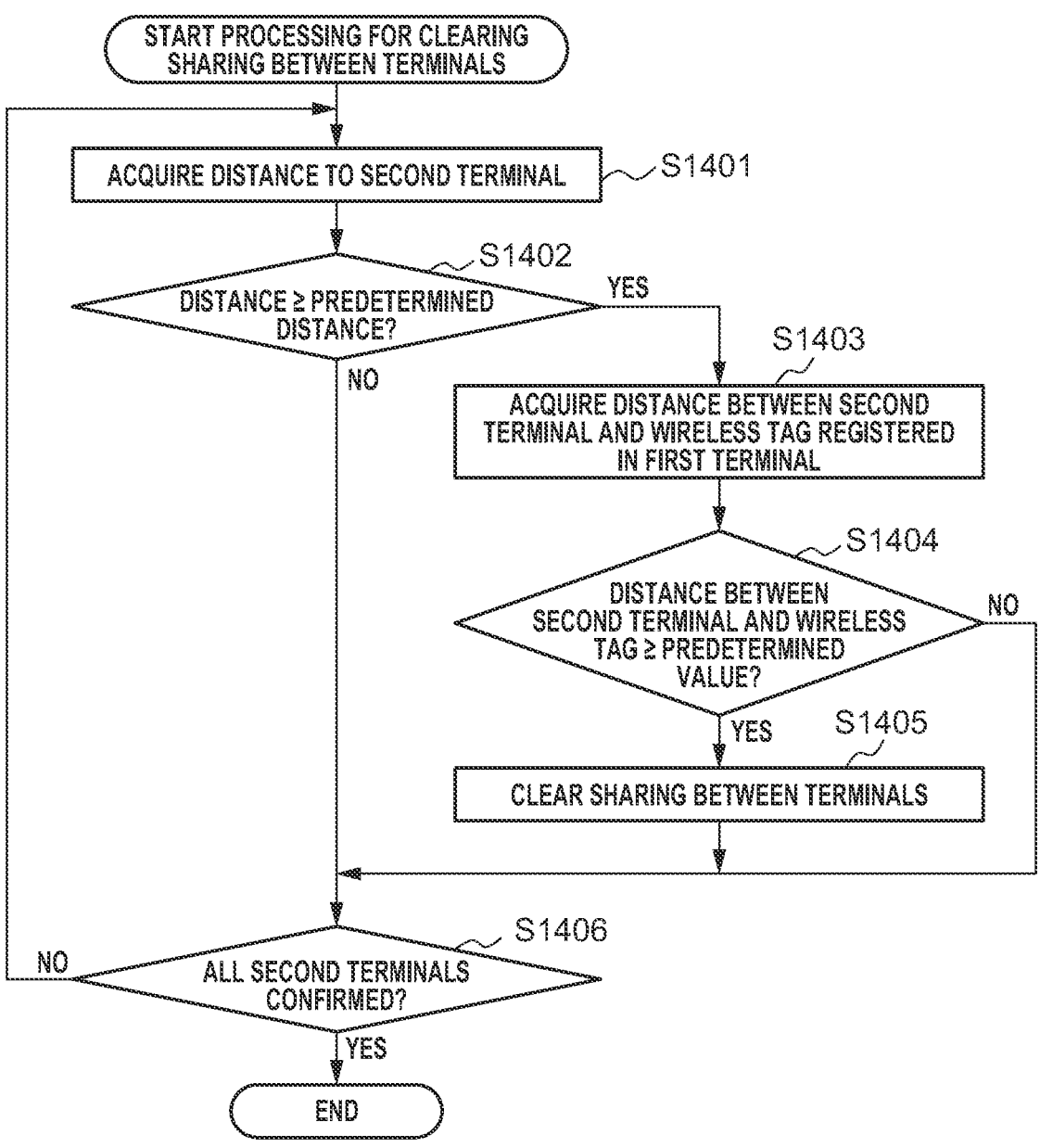
FIG. 14 is a flowchart illustrating processing for clearing sharing between terminals.

FIG. 14 is a flowchart illustrating processing for clearing sharing between terminals according to the present exemplary embodiment. The processing in the present flowchart is periodically performed. In the present exemplary embodiment, the following is a description on the assumption that the processing is performed by the first terminal 10, but the processing can be performed by the second terminal 30.

In step S1401, the first terminal 10 acquires the inter-terminal distance to the second terminal 30.

As a method for acquiring the inter-terminal distance, the position information about the second terminal 30 can be used as in the first exemplary embodiment, and the communication distance in the short-range wireless communication can be used.

In step S1402, the first terminal 10 determines whether the distance to the second terminal 30 is the predetermined distance or more. If the first terminal 10 determines that the distance is the predetermined distance or more (YES in step S1402), the processing proceeds to step S1403. If the first terminal 10 determines that the distance is less than the predetermined distance (NO in step S1402), the processing proceeds to step S1406.

In step S1403, the first terminal 10 inquires of the second terminal 30 about the communication distance to the shared wireless tag 20 and acquires it.

In step S1404, the first terminal 10 determines whether the communication distance acquired in step S1403 is a predetermined value or more. If the first terminal 10 determines that the communication distance is the predetermined value or more (YES in step S1404), the second terminal 30 is away from both the first terminal 10 and the wireless tag 20. This leads to a determination that the first user and the second user do not accompany each other, and the processing proceeds to step S1405. If it is determined that the communication distance is less than the predetermined value (NO in step S1404), the processing proceeds to step S1406.

In step S1405, the first terminal 10 clears sharing between the terminals. In other words, the first terminal 10 clears the second terminal 30 from an execution entity that performs the loss detection processing (in step S402).

At this time, the situation is the same as losing both the first terminal 10 and the personal belonging to which the wireless tag 20 is attached. In consideration of that situation, before clearing the sharing, a warning can be issued by displaying a message such as "the paired user can have lost both the terminal and the personal belonging, but do you want to clear the sharing?" In one embodiment, a warning is issued to the first terminal 10 by displaying a message such as "if both the terminal and the personal belonging are lost, they cannot be detected, but do you want to clear the sharing?" in setting an automatic clearing operation.

In step S1406, the first terminal 10 repeatedly performs the processing in steps S1403 to S1405 on all the terminals that have registered the sharing. If the processing is performed on all the terminals (YES in step S1406), then the series of processing in the flowchart is terminated.

According to the above-described third exemplary embodiment, registration and clearing of terminals that share information can be automatically performed.

While the present disclosure has been described above with reference to the exemplary embodiments, the above-described exemplary embodiments are merely examples for implementing the present disclosure and these examples are not seen to restrictively limit the technical scope of the present disclosure. In other words, the present disclosure can be implemented in the various forms without departing from the technical idea and/or the main features thereof.

According to the first and the second exemplary embodiments described above, the examples have been described in which the loss detection processing (in step S402) in FIG. 4 is periodically performed. In another exemplary embodiment, the execution frequency of the loss detection processing can be changed based on the remaining battery life of the first terminal 10 or the second terminal 30 or the communication status between the first terminal 10 or the second terminal 30 and the wireless tag 20. For example, if the remaining battery life of the first terminal 10 is low, the communication frequency between the first terminal 10 and the wireless tag 20 can be reduced to reduce the battery consumption of the first terminal 10. If the communication status between the first terminal 10 and the wireless tag 20 is not good, the communication frequency can be increased between the first terminal 10 and the wireless tag 20.

The loss detection processing (in step S402) in FIG. 4 can be performed in passing through a certain checkpoint. For example, a specific point such as an entrance and an exit of a Shinkansen bullet train, a station ticket gate, or a building elevator is set as a checkpoint. If the first terminal 10 passes through the checkpoint, the loss detection processing is started. If the checkpoint is set, the communication frequency between the first terminal 10 or the second terminal 30 and the wireless tag 20 can be reduced, which can reduce the battery consumption of the first terminal 10 and the second terminal 30.

According to the present disclosure, a notification of loss can be made taking into account a case where a user has lost a mobile terminal.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While exemplary embodiments have been provided, these embodiments are not seen to be limiting. The scope of the following claims is to be accorded the broadest interpretation so as to encompass all such modifications and equivalent structures and functions.

This application claims the benefit of Japanese Patent Application No. 2021-205930, filed Dec. 20, 2021, which is hereby incorporated by reference herein in its entirety.

What is claimed is:

1. An information processing system comprising a first mobile terminal carried by a first user and a second mobile terminal carried by a second user who accompanies the first user, wherein the first mobile terminal includes:

a communication unit configured to communicate with a wireless tag attached to a personal belonging of the first user;

an acquisition unit configured to acquire an inter-terminal distance between the first mobile terminal and the second mobile terminal;

a detection unit configured to perform detection processing for detecting loss of at least the personal belonging or the first mobile terminal based on (i) whether communication between the first mobile terminal and the wireless tag is possible and (ii) whether the inter-terminal distance is greater than or equal to a predetermined value; and

a transmission unit configured to transmit a detection result of the detection processing to the second mobile terminal, and wherein the second mobile terminal includes:

a reception unit configured to receive the detection result from the first mobile terminal; and a control unit configured to perform control to output a notification indicating the detection result received by the reception unit.

2. The information processing system according to claim 1, wherein, in a case where communication with the wireless tag cannot occur, the detection unit determines whether the inter-terminal distance is greater than or equal to a predetermined value.

3. The information processing system according to claim 1, wherein, in a case where the detection unit determines the inter-terminal distance is greater than or equal to the predetermined value, the detection unit detects loss of the first mobile terminal.

4. The information processing system according to claim 2, wherein, the inter-terminal distance is less than a predetermined value, the detection unit detects loss of the personal belonging.

5. The information processing system according to claim 1, wherein, in a case where communication with the wireless tag can occur and the inter-terminal distance is greater than or equal to a predetermined value, the detection unit detects loss of both the first mobile terminal and the personal belonging.

6. The information processing system according to claim 1, wherein the second mobile terminal includes a transmission unit configured to transmit position information about the second mobile terminal, wherein the first mobile terminal includes a reception unit configured to receive the position information from the second mobile terminal, and wherein the acquisition unit calculates the inter-terminal distance based on position information about the first mobile terminal and the position information received by the reception unit of the first mobile terminal.

7. The information processing system according to claim 1, wherein the detection unit changes execution frequency of the detection processing based on at least a remaining battery life of the first mobile terminal or a communication status of the communication unit.

8. The information processing system according to claim 1, wherein the detection unit performs the detection processing in response to a detection of passage through a predetermined checkpoint.

9. The information processing system according to claim 1, wherein the first mobile terminal includes a registration unit configured to automatically register, as the second mobile terminal, a mobile terminal that exists for a predetermined time or longer within a predetermined distance and is registered in an address book of the first mobile terminal.

10. A method for controlling an information processing system including a first mobile terminal carried by a first user and a second mobile terminal carried by a second user who accompanies the first user, the method comprising:

causing the first mobile terminal to perform communication with a wireless tag attached to a personal belonging of the first user;

causing the first mobile terminal to acquire an inter-terminal distance between the first mobile terminal and the second mobile terminal;

causing the first mobile terminal to perform detection processing for detecting loss of at least the personal belonging or the first mobile terminal based on (i) whether communication between the first mobile terminal and the wireless tag is possible and (ii) whether the inter-terminal distance is greater than or equal to a predetermined value;

causing the first mobile terminal to transmit a detection result by the detection to the second mobile terminal;

causing the second mobile terminal to receive the detection result from the first mobile terminal; and causing the second mobile terminal to perform control to output a notification indicating the received detection result.

11. A non-transitory computer-readable storage medium storing a program of an information processing system that includes a first mobile terminal carried by a first user and a second mobile terminal carried by a second user who accompanies the first user, the program causing the information processing system to execute a method that causes:

the first mobile terminal to:

communicate with a wireless tag attached to a personal belonging of the first user;

acquire an inter-terminal distance between the first mobile terminal and the second mobile terminal;

perform detection processing for detecting loss of at least the personal belonging or the first mobile terminal based on (i) whether communication between the first mobile terminal and the wireless tag is possible and (ii) whether the inter-terminal distance is greater than or equal to a predetermined value; and transmit a detection result of the detection processing to the second mobile terminal, and the second mobile terminal to:

receive the detection result from the first mobile terminal; and perform control to output a notification indicating the received detection result.

* * * * *